United States Patent
Huh et al.

(10) Patent No.: US 9,755,751 B2
(45) Date of Patent: Sep. 5, 2017

(54) OPTICAL TRANSCEIVER OF FLEXIBLE MODULATION FORMAT

(71) Applicant: ELECTRONICS AND TELECOMMUNICATIONS RESEARCH INSTITUTE, Daejeon-si (KR)

(72) Inventors: Joon Young Huh, Daejeon-si (KR); Jong Hyun Lee, Daejeon-si (KR); Jyung Chan Lee, Daejeon-si (KR); Joon Ki Lee, Daejeon-si (KR); Sae Kyoung Kang, Daejeon-si (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/016,952

(22) Filed: Feb. 5, 2016

(65) Prior Publication Data

US 2016/0233961 A1    Aug. 11, 2016

(30) Foreign Application Priority Data

Feb. 5, 2015   (KR) .................. 10-2015-0018181

(51) Int. Cl.
*H04B 10/00* (2013.01)
*H04B 10/04* (2006.01)
(Continued)

(52) U.S. Cl.
CPC ......... *H04B 10/40* (2013.01); *H04B 10/5161* (2013.01); *H04B 10/60* (2013.01);
(Continued)

(58) Field of Classification Search
None
See application file for complete search history.

(56) References Cited

U.S. PATENT DOCUMENTS 5,793,782 A * 8/1998 Meyrueix ............ H04B 10/505
359/276
7,149,474 B1 * 12/2006 Mikhak ................ H04M 1/738
370/259
(Continued)

FOREIGN PATENT DOCUMENTS

GB   WO 2006032628 A1 * 3/2006 ............. H04B 10/40

OTHER PUBLICATIONS

Dixon, Robert C., Radio Receiver Design, 1998, Marcel Dekker, Inc. p. 135.*
(Continued)

*Primary Examiner* — Ken N Vanderpuye
*Assistant Examiner* — Jai Lee
(74) *Attorney, Agent, or Firm* — Ladas & Parry LLP; Loren K. Thompson

(57) ABSTRACT

An optical transceiver of a flexible modulation format. The optical transceiver may include an optical transmitter to convert an electrical signal to an optical signal and transmit the optical signal, an optical receiver to receive and convert the optical signal to an electrical signal, and a controller to set modulation formats of the optical transmitter and the optical receivers according to modulation format information.

7 Claims, 6 Drawing Sheets

(51) Int. Cl.
*H04B 10/40* (2013.01)
*H04L 27/00* (2006.01)
*H04L 7/00* (2006.01)
*H04L 7/033* (2006.01)
*H04B 10/516* (2013.01)
*H04B 10/60* (2013.01)
*H04L 27/02* (2006.01)
*H04L 27/20* (2006.01)

(52) U.S. Cl.
CPC .......... *H04L 7/0075* (2013.01); *H04L 7/0331* (2013.01); *H04L 7/0334* (2013.01); *H04L 27/0008* (2013.01); *H04L 27/0012* (2013.01); *H04L 27/02* (2013.01); *H04L 27/2067* (2013.01)

(56) References Cited

U.S. PATENT DOCUMENTS

| | | | | |
|---|---|---|---|---|
| 7,505,541 | B1 * | 3/2009 | Brunn | H03D 13/003 375/360 |
| 7,680,420 | B1 * | 3/2010 | Walker | H04B 10/25137 398/183 |
| 8,311,417 | B1 | 11/2012 | Poggiolini et al. | |
| 9,065,601 | B1 * | 6/2015 | Jenkins | H03L 7/0812 |
| 2005/0220217 | A1 * | 10/2005 | Yamawaki | H04L 27/0008 375/297 |
| 2008/0107423 | A1 * | 5/2008 | Lee | H04L 25/03343 398/136 |
| 2008/0259656 | A1 * | 10/2008 | Grant | H02M 3/33523 363/21.18 |
| 2011/0299858 | A1 * | 12/2011 | Mazzini | H04B 10/516 398/183 |
| 2012/0294623 | A1 * | 11/2012 | Lee | H04B 10/2503 398/135 |
| 2013/0057340 | A1 * | 3/2013 | Kunihiro | H03F 1/0211 330/75 |
| 2013/0209091 | A1 | 8/2013 | Mateosky et al. | |
| 2013/0287407 | A1 * | 10/2013 | Pan | H04B 10/40 398/139 |
| 2014/0255037 | A1 * | 9/2014 | Shang | H04L 27/01 398/115 |
| 2015/0249501 | A1 * | 9/2015 | Nagarajan | H04B 10/40 398/79 |
| 2015/0365177 | A1 * | 12/2015 | Blumenthal | H04B 10/40 398/9 |
| 2016/0072651 | A1 * | 3/2016 | Welch | H04B 10/00 375/286 |
| 2016/0087727 | A1 * | 3/2016 | Nagatani | H03G 3/3084 398/186 |

OTHER PUBLICATIONS

Resso et al., Signal Integrity Characterization Techniques, 2009, Professional Education International, Inc., pp. 600-602.*
Azadeh, Mohammad, Fiber Optics Engineering, 2009, Springer Science+Business Media, LLC, pp. 242-246.*

* cited by examiner

OPTICAL TRANSCEIVER OF FLEXIBLE MODULATION FORMAT

CROSS-REFERENCE TO RELATED APPLICATION(S)

This application claims the benefit under 35 U.S.C. §119(a) of Korean Patent Application No. 10-2015-0018181, filed on Feb. 5, 2015, in the Korean Intellectual Property Office, the entire disclosure of which is incorporated herein by reference for all purposes.

BACKGROUND

1. Field

The following description relates to an optical transceiver.

2. Description of the Related Art

An optical transceiver is a module for receiving an electrical signal to generate an optical signal, or for receiving an optical signal to generate an electrical signal. Due to a rapid increase in traffic caused by smartphones or video streaming services, etc., various efforts are in progress to increase transmission capacity for optical transceivers, which may be a core of an optical network. A typical method thereof is to convert a transmission format. A transmission format of an optical signal used in a past optical transmission network is a non-return-to-zero (NRZ) method. However, various modulation formats are recently used according to a target transmission distance or a required quality for an optical signal, such as dual polarization quadrature phase-shift keying (DP-QPSK), duobinary, and 4-level pulse amplitude modulation (PAM-4).

Meanwhile, an optical transceiver may include modulators and driver amplifiers, of which the number may change according to a used modulation format, and a required performance for a clock and data recovery (CDR) circuit may change. Accordingly, a network to be dynamically re-configured becomes greatly necessary to accept an increase in traffic and a network complexity

SUMMARY

The purpose of the following description is to provide an optical transceiver that supports various modulation formats.

In one general aspect, an optical transceiver of a flexible modulation format includes: an optical transmitter to transmit an electrical signal to an optical signal; an optical receiver to receive and convert the optical signal to an electrical signal; and a controller to set modulation formats of the optical transmitter and the optical receiver according to modulation format information.

In another general aspect, an optical transmitter of a flexible modulation format includes: a CDR circuit to recover a clock and data of a signal to be transmitted; a driver amplifier to amplify the recovered signal; a limiter for transmission, which is configured to limit an input signal. In another general aspect, an optical receiver with a flexible modulation format includes: a limiter for reception to limit a size of a received signal; and a CDR circuit to recover a clock and data from the signal, of which the size is limited.

The limiters for transmission and reception may limit a high level of a binary signal According to the modulation format information, the controller may control the limiters for transmission and reception to turn on or off, and control operation modes of the CDR circuits for transmission and reception as operation modes for processing a binary signal or a multi-level signal.

The limiter for transmission may be an electrical limiter or an optical limiter.

In another general aspect, an optical transmitter of a flexible modulation format includes: a CDR circuit to recover a clock and data of a signal to be transmitted; a driver amplifier to amplify the recovered signal; a limiter for transmission, which is configured to limit an input signal; and a controller to control the limiter for transmission to turn on or off according to modulation format information, and control an operation mode of the CDR circuit for transmission as an operation mode for processing a binary signal or a multi-level signal.

In another general aspect, an optical receiver with a flexible modulation format includes: a limiter for reception to limit a size of a received signal; a CDR circuit to recover a clock and data from the signal, of which the size is limited; and a controller to control the limiter for reception to turn on or off according to modulation format information, and control an operation mode of the CDR circuit for reception as an operation mode for processing a binary signal or a multi-level signal.

Other features and aspects may be apparent from the following detailed description, the drawings, and the claims.

Figure 1:
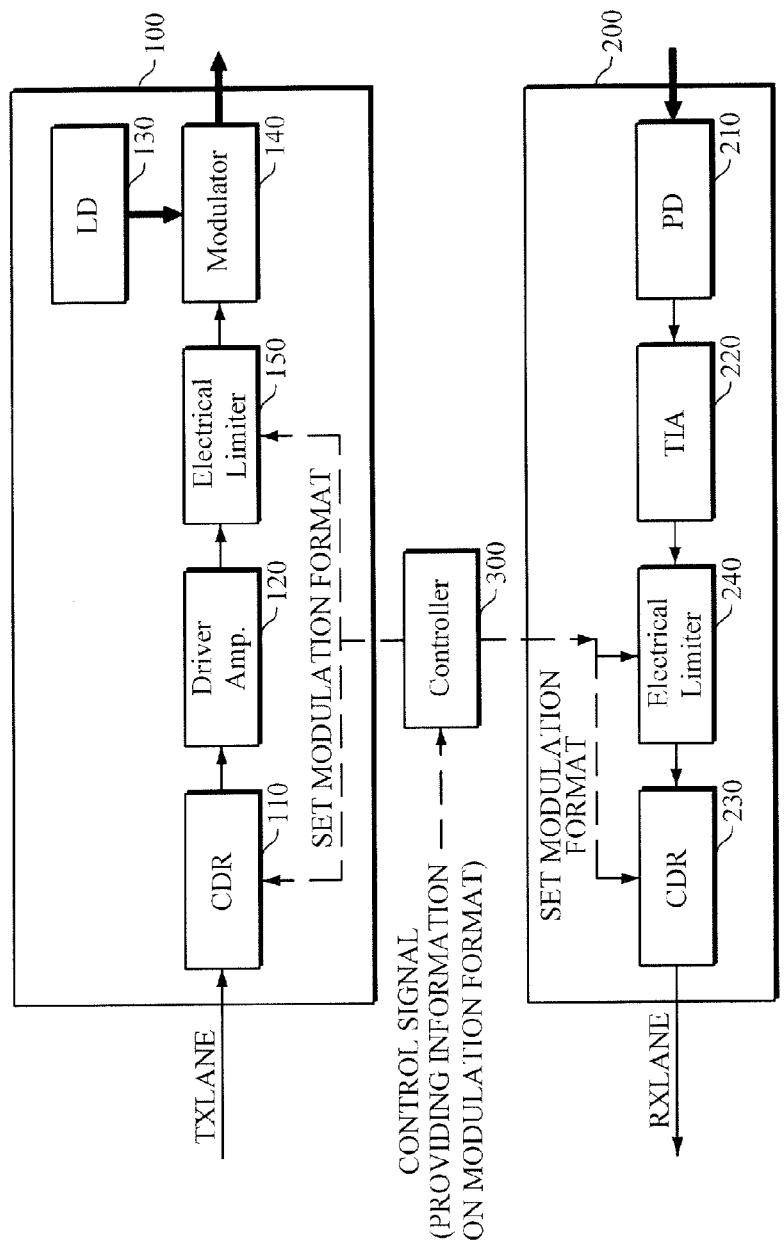
FIG. 1 is a diagram illustrating an optical transceiver according to an exemplary embodiment when modulation format information is provided from the outside thereof.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an optical transceiver according to an exemplary embodiment, which is the exemplary embodiment when modulation format information is provided from the outside. The optical transceiver may be implemented in a network device, such as an Ethernet device. As illustrated in FIG. 1, the optical transceiver includes an optical transmitter 100 and an optical receiver 200. The optical transmitter 100 converts, to an optical signal, an electrical signal to be transmitted and optically transmits the optical signal. The optical receiver 200 converts the optical signal, received through an optical cable, to an electrical signal. The optical transmitter 100 may include a clock and data recovery (CDR) circuit 110 (hereinafter simply referred to as 'CDR'), a driver amplifier (driver amp.) 120, a laser diode (LD), and a modulator. Their functions and operations are well-known in the art. The optical receiver 200 may include a photodiode (PD) 210, a transimpedance amplifier (TIA) 220, and a CDR 230. Also, their functions and operations are well-known in the art.

The optical transceiver including the above-mentioned components may have different required performance for the inner configuration according to a modulation format being used. Among them, the driver amplifier 120 of the optical transmitter 100, and the TIA 220 of the optical receiver 200 have types that are largely divided into a linear type and a limiting type, which is required to be appropriately selected according to the modulation format. A typical binary signal, such as a non-return-to-zero (NRZ) method, may acquire good performance only if the limiting type is used, but a linear type for a multi-level signal acquired according to 4-level pulse amplitude modulation (PAM-4).

In consideration of these characteristics, a controller 300 sets the modulation format of the optical transmitter 100 or the optical receiver 200 according to the modulation format information. Here, the modulation format information may be provided from the outside, for example, a main controller of an Ethernet device. The modulation format information may give information thereof, itself, or information on a signal type (a binary signal or a multi-level signal) according to the modulation format. The controller 300 sets the modulation format of the optical transmitter 100 or the optical receiver 200 according to the modulation format information. In other words, for a binary signal, the controller 300 sets the modulation format to the limiting type, and for the multi-level signal, the linear type.

As illustrated in FIG. 1, the optical transmitter 100 may include an electrical limiter 150 for transmission (hereinafter referred to as 'transmission limiter'), and the optical receiver 200 may include an electrical limiter 240 for reception (hereinafter referred to as 'reception limiter'). The transmission limiter 150 may be positioned after the driver amplifier 120, and the reception limiter 240 may be positioned after the TIA 220. However, different from such a configuration, the transmission limiter 150 may be built into the driver amplifier 120, and the reception limiter 240 may be built into the TIA 220. Such limiters 150 and 240 may be electrical elements for limiting a size of a signal. In one exemplary embodiment, the limiters 150 and 240 limit a high level ('1') of a binary signal. The controller 300 sets the modulation format according to the modulation format information, and more specifically, sets the modulation formats for the limiters 150 and 240 and the CDRs 110 and 230 as illustrated in FIG. 1. For an additional description, for a binary signal, the controller 300 controls the limiters 150 and 240 to turn on so as to operate the driver amplifier 120 and the TIA 220 as the limiting type; and for a multi-level signal, controls the limiters 150 and 240 to turn off so as to operate the driver amplifier 120 and the TIA 220 as the linear type.

For a binary signal, the CDRs 110 and 230 controls a circuit portion to be activated, which is required for processing the binary signal; and for a multi-level signal, controls a circuit portion to be activated, which is required for processing the multi-level signal. For example, the CDR may include a circuit module according to each modulation format. In this case, the controller 300 controls only the relevant circuit module to be operated. For another example, the CDR for PAM-4 may be used for not only a PAM-4 signal but an NRZ signal, so for a multi-level signal, the controller 300 activates the entire circuit of the CDR so that it operates and for a binary signal, deactivates the unnecessary elements among the circuits. To sum up, operation modes of the CDRs 110 and 230 may be divided into two that are for the multi-level signal processing and the binary signal processing, and set the circuit to be operated in an operation mode according to the modulation format information.

Figure 2:
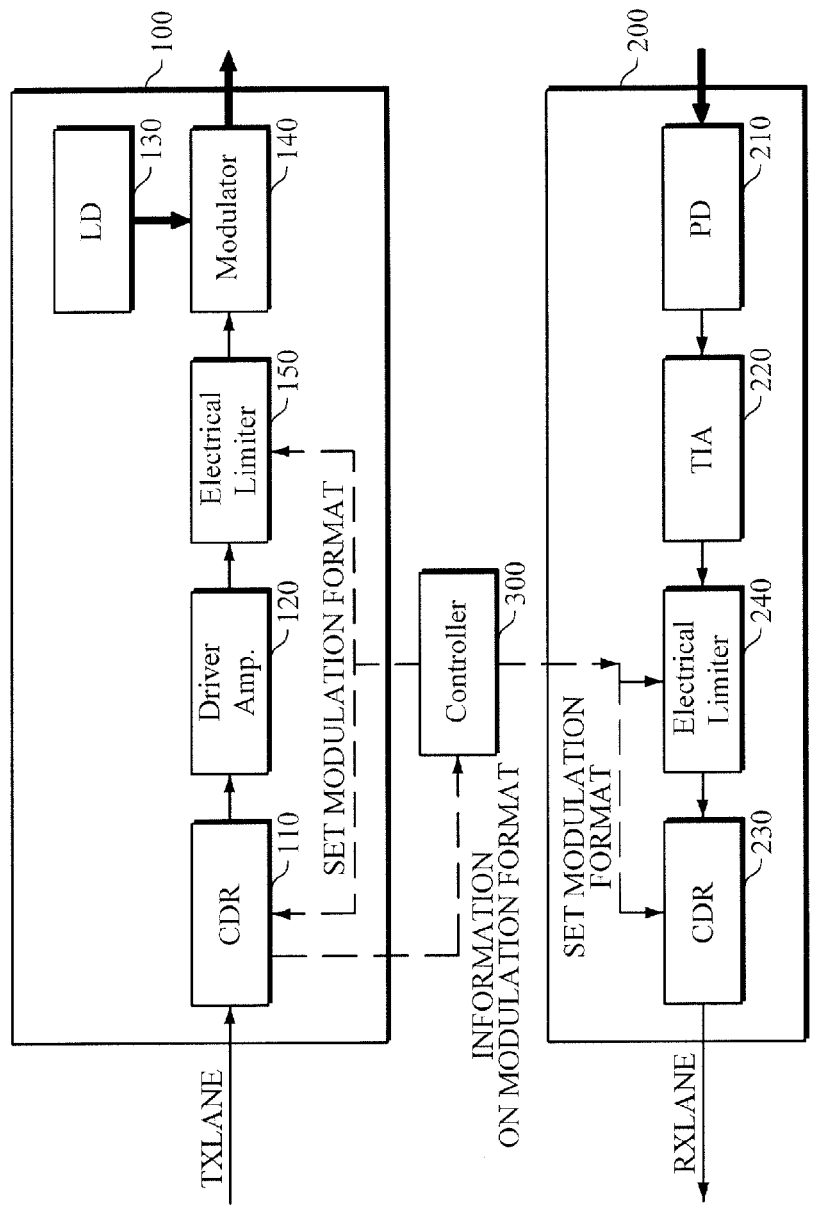
FIG. 2 is a diagram illustrating an optical transceiver according to an exemplary embodiment when modulation format information is provided from the inside thereof.

FIG. 2 is a diagram illustrating an optical transceiver according to an exemplary embodiment when modulation format information is provided from the inside thereof. In one exemplary embodiment, a CDR 110 for transmission (hereinafter referred to as 'transmission CDR) may include a function for discriminating a type of a signal to be transmitted, i.e., modulation format information. A technology for identifying the modulation format is well-known, e.g., decision theory-based approaches (DTBA) and feature matching-based approaches (FMRA). There is no limit to a technological method for discriminating the modulation format information, which is additionally included in the CDR. Accordingly, the controller 300 receives the modulation format information from the transmission CDR 110 and then sets the modulation format.

Figure 3:
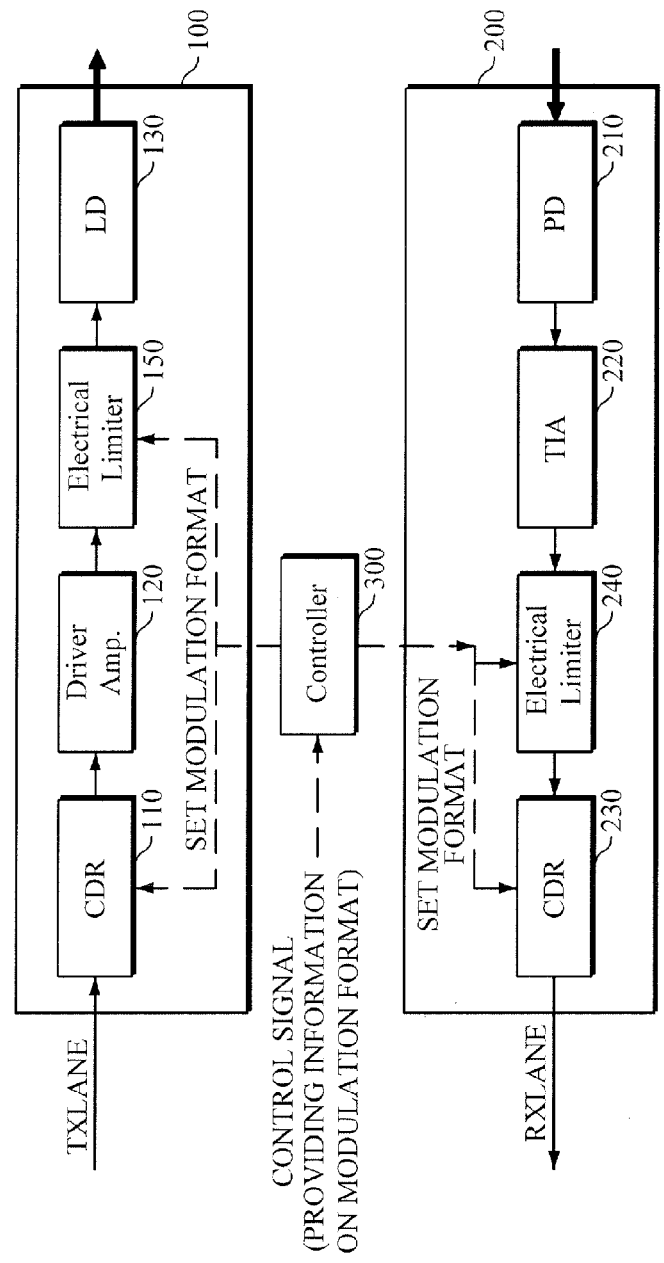
FIG. 3 is a diagram illustrating an optical transceiver according to an exemplary embodiment using a direct modulation format, in which the modulation format information is provided from the outside thereof.

FIG. 3 is a diagram illustrating an optical transceiver according to an exemplary embodiment using a direct modulation format, in which the modulation format information is provided from the outside thereof. The method for setting a modulation format, as described above, may be applied to a structure where a modulator 140 is not used, as illustrated in FIG. 3. Also, a plurality of driver amplifiers and modulators may be used, and in this case, an electrical limiter may be positioned after the driver amplifier.

Figure 4:
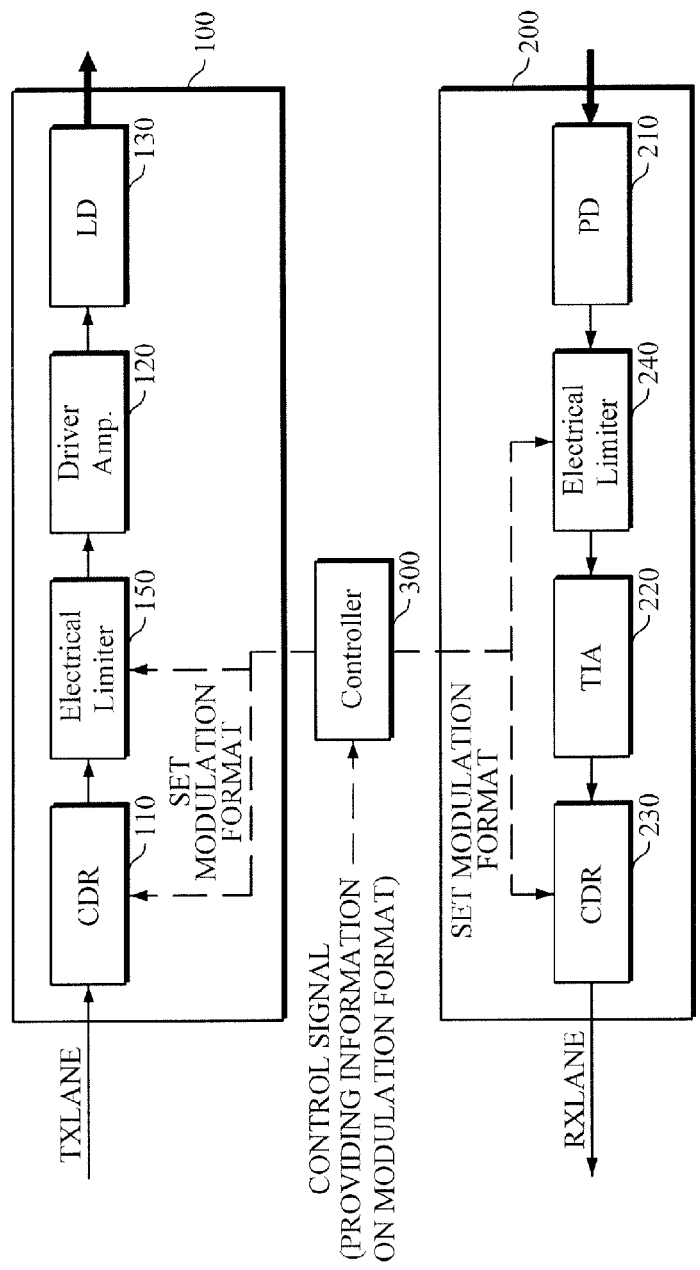
FIG. 4 is a diagram illustrating an optical transceiver according to an exemplary embodiment, which shows, when an electrical limiter is used, the application position thereof.

FIG. 4 is a diagram illustrating an optical transceiver according to an exemplary embodiment, which shows, when an electrical limiter is used, the application position thereof. A transmission limiter 150 may be positioned before a driver amplifier 120; and a reception limiter 240 may be positioned before a TIA 220. Alternatively, the transmission limiter 150 may be built in the driver amplifier 120 or a transmission CDR 110; and the reception limiter 240 may be built in the TIA 220.

Figure 5:
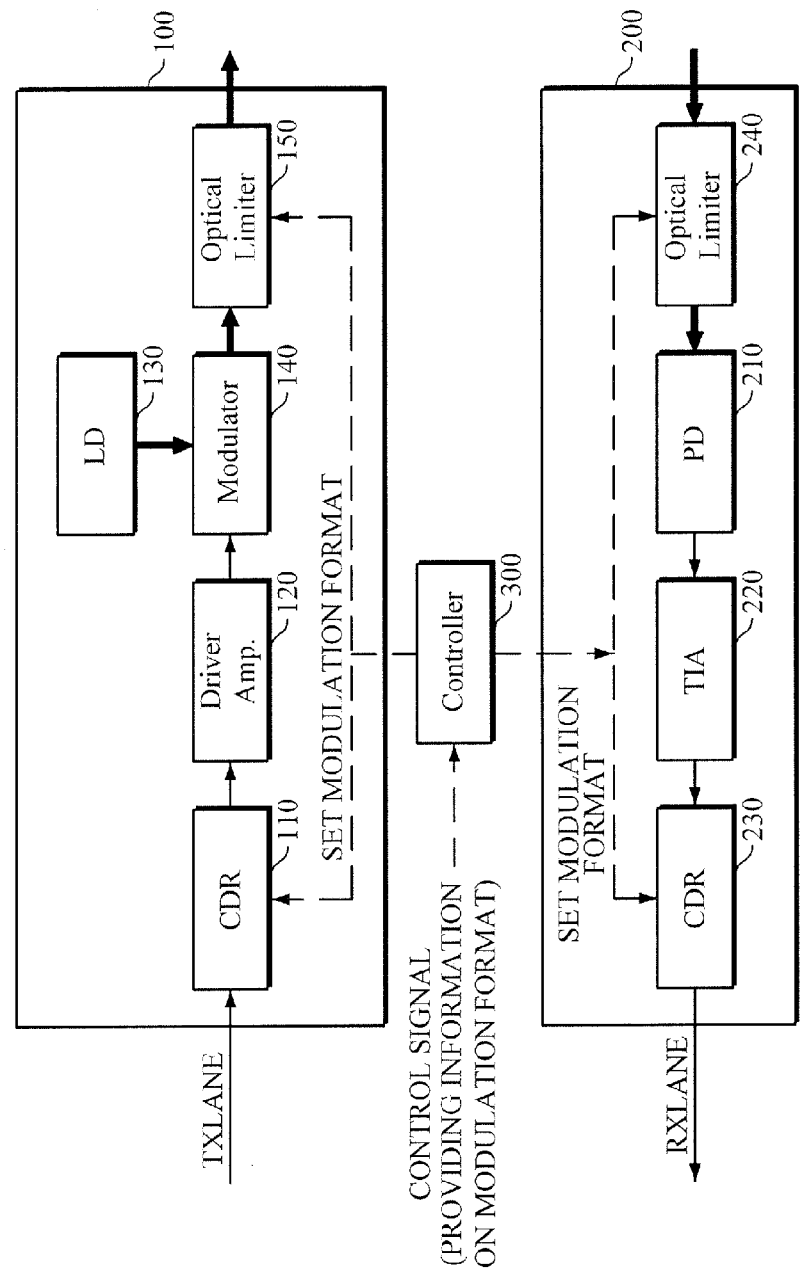
FIG. 5 is a diagram illustrating an optical transceiver according to an exemplary embodiment, which shows, when an optical limiter is used, the application position thereof.

FIG. 5 is a diagram illustrating an optical transceiver according to an exemplary embodiment, which shows, when an optical limiter is used, the application position thereof. A function of the limiter may be implemented in not only an electrical but optical way. As illustrated in FIG. 5, in an optical transmitter 100, the optical limiter may be applied after an electrical signal is converted to an optical signal; and in the optical receiver 200, may be applied before an optical signal is modulated to an electrical signal. In other words, in the optical transmitter 100, the optical limiter 150 is positioned after a modulator 140; and in the optical receiver 200, an optical limiter 240 may be positioned before a photodiode 210.

Figure 6:
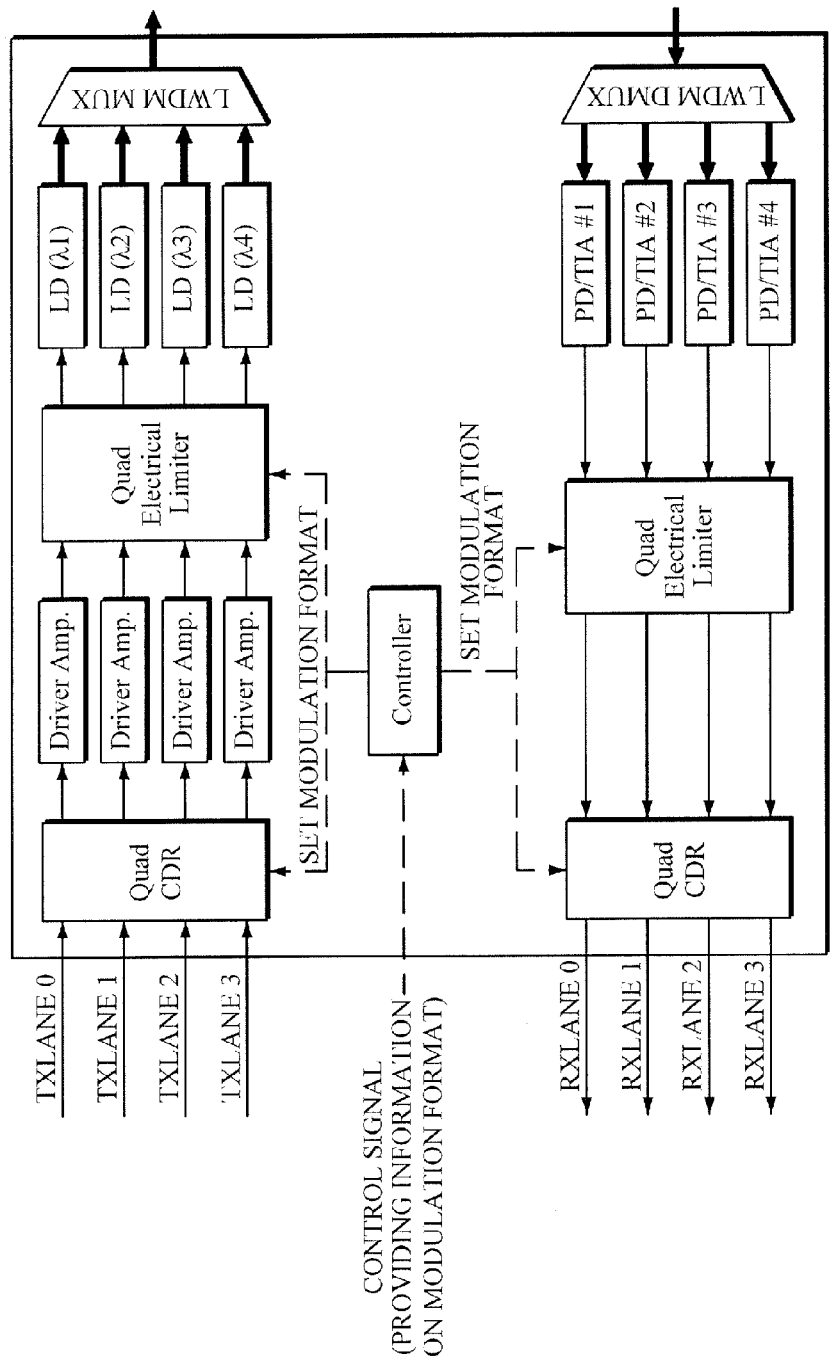
FIG. 6 is a diagram illustrating a four-channel optical transceiver according to an exemplary embodiment, where an electrical limiter is used.

FIG. 6 is a diagram illustrating a four-channel optical transceiver according to an exemplary embodiment, where an electrical limiter is used. The electrical limiter may be applied to a multiple-channel optical transceiver including four channels, as illustrated in FIG. 6. Also, the above-mentioned modulation method may be applied independently to each module of the optical transmitter and the optical receiver.

According to an exemplary embodiment, an optical transceiver of a flexible modulation format effectively implements an optical transceiver that supports various modulation formats.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical transceiver of a flexible modulation format, comprising:
    an optical transmitter configured to convert an electrical signal to an optical signal, and transmit the optical signal, the optical transmitter including aa clock and data recovery (CDR) circuit for transmission to recover a clock and data of a signal that is to be transmitted, a driver amplifier to amplify the recovered signal, and a limiter for transmission to limit a size of the recovered signal;
    an optical receiver configured to receive and convert the optical signal to an electrical signal, the optical receiver including a limiter for reception to limit a size of a received signal, and a CDR circuit for reception to recover a clock and data from the signal, of which the size is limited; and
    a controller configured to set modulation formats of the optical transmitter and the optical receiver, and to control the limiters for transmission and reception to turn on or off, and control operation modes of the CDR circuit for transmission and reception as operation modes for processing a binary signal or a multi-level signal, according to modulation format information.

2. The optical transceiver of claim 1, wherein the limiters for transmission and reception are configured to limit a high level of a binary signal.

3. The optical transceiver of claim 1, wherein the limiter for transmission is configured to be an electrical limiter or an optical limiter.

4. An optical transmitter of a flexible modulation format, comprising:
    a CDR circuit configured to recover a clock and data of a signal that is input through a transmission lane;
    a driver amplifier configured to amplify the recovered signal;
    a limiter for transmission, which is configured to limit an input signal; and
    a controller configured to control the limiter for transmission to turn on or off according to modulation format information, and control an operation mode of the CDR circuit for transmission as an operation mode for processing a binary signal or a multi-level signal.

5. The optical transmitter of claim 4, wherein the limiter for transmission is configured to limit a high level of a binary signal.

6. An optical receiver with a flexible modulation format, comprising:
    a limiter for reception configured to limit a size of a received signal;
    a CDR circuit configured to recover a clock and data from the signal, of which the size is limited; and
    a controller configured to control the limiter for reception to turn on or off according to modulation format information, and control an operation mode of the CDR circuit for reception as an operation mode for processing a binary signal or a multi-level signal.

7. The optical receiver of claim 6, wherein the limiter for reception is configured to limit a high level of a binary signal.

* * * * *